(12) United States Patent
Yang et al.

(10) Patent No.: US 11,150,796 B2
(45) Date of Patent: Oct. 19, 2021

(54) METHOD, SYSTEM, AND DEVICE FOR INTERFACING WITH A COMPONENT IN A PLURALITY OF INTERACTION MODES

(71) Applicant: BANMA ZHIXING NETWORK CO., LIMITED, Kowloon (HK)

(72) Inventors: Yang Yang, Beijing (CN); Lei Wang, Beijing (CN); Kai Wang, Beijing (CN); Zhijun Yuan, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 39 days.

(21) Appl. No.: 16/548,441

(22) Filed: Aug. 22, 2019

(65) Prior Publication Data

US 2020/0073529 A1   Mar. 5, 2020

(30) Foreign Application Priority Data

Aug. 29, 2018 (CN) .......................... 201810996957.4

(51) Int. Cl.
*G06F 3/0487* (2013.01)
*G06F 3/01* (2006.01)
*G06F 3/16* (2006.01)
*G06F 3/0482* (2013.01)

(52) U.S. Cl.
CPC ............ *G06F 3/0487* (2013.01); *G06F 3/017* (2013.01); *G06F 3/0482* (2013.01); *G06F 3/167* (2013.01)

(58) Field of Classification Search
CPC ........ G06F 3/0487; G06F 3/017; G06F 3/167; G06F 3/0482; G06F 3/0304; G06F 2203/0381; G06F 3/04883; G06F 3/038; G06F 3/04886; G06F 3/16; G06F 2203/0382

See application file for complete search history.

(56) References Cited

U.S. PATENT DOCUMENTS

| | | | |
|---|---|---|---|
| 6,853,391 | B2 | 2/2005 | Bates |
| 9,189,131 | B2 | 11/2015 | Thiruvidam |
| 9,582,165 | B2 | 2/2017 | Wilson |
| 9,632,664 | B2 | 4/2017 | Foss |
| 9,823,839 | B2 | 11/2017 | Brown |
| 10,126,930 | B2 | 11/2018 | Zambetti |
| 10,296,166 | B2 | 5/2019 | Wagner |
| 2005/0159957 | A1 | 7/2005 | Roth |
| 2009/0177477 | A1 | 7/2009 | Nenov |
| 2011/0205149 | A1 | 8/2011 | Tom |
| 2013/0172022 | A1 | 7/2013 | Seymour |

(Continued)

*Primary Examiner* — Phuong H Nguyen
(74) *Attorney, Agent, or Firm* — Van Pelt, Yi & James LLP

(57) ABSTRACT

The present application discloses a method, device, and system for interfacing with a component in a plurality of interaction modes. The method includes obtaining an input, determining that the input corresponds to an interaction event in a first interaction mode, the first interaction mode being a non-touch interaction mode, determining a component corresponding to the interaction event based at least in part on registration information for the first interaction mode, wherein the component is mapped to a plurality of interaction events for a plurality of interaction modes, and performing a response operation based at least in part on the registration information associated with the component and the interaction event.

19 Claims, 7 Drawing Sheets

(56) References Cited

U.S. PATENT DOCUMENTS

| | | |
|---|---|---|
| 2014/0118268 A1 | 5/2014 | Kuscher |
| 2015/0067513 A1 | 3/2015 | Zambetti |
| 2016/0070466 A1 | 3/2016 | Chaudhri |
| 2017/0019515 A1* | 1/2017 | Youn .................. G10L 15/1815 |
| 2019/0171353 A1 | 6/2019 | Missig |

* cited by examiner

METHOD, SYSTEM, AND DEVICE FOR INTERFACING WITH A COMPONENT IN A PLURALITY OF INTERACTION MODES

CROSS REFERENCE TO OTHER APPLICATIONS

This application claims priority to People's Republic of China Patent Application No. 201810996957.4 entitled INTERACTION METHOD, STORAGE MEDIUM, OPERATING SYSTEM AND DEVICE filed Aug. 29, 2018 which is incorporated herein by reference for all purposes.

FIELD OF THE INVENTION

The present invention relates to a field of Internet technology. In particular, the present application relates to an interaction method, storage medium, operating system, and device.

BACKGROUND OF THE INVENTION

A wide variety of human-computer interaction modes have been applied broadly among different human-machine interaction contexts. For example, a user can interface with components displayed on an interface using a touch interaction (e.g., a touch screen input such as a touch, a swipe, etc.). As another example, a user can interface with an application program (app) executing on a terminal such as a mobile terminal by using a voice command (e.g., inputting a voice command or the like into a microphone connected to the terminal, etc.). As another example, a user can interface with a terminal in a virtual reality context to input tangible or gesture inputs.

In the related art, the various human-computer interaction modes (e.g., touch inputs, voice inputs, and virtual reality inputs) are generally mutually independent. Further, even if such interaction modes are integrated, the form that their integration takes is relatively narrow in scope. For example, an app operating in a voice interaction context can, upon receiving a voice command, present response information in response to the voice command through an interface such as a graphical user interface. In response to the response information being provided to the user via the interface, the user thereupon can perform a touch operation on the interface. For example, the touch operation on the interface is directed at the response information displayed on the interface. The integration of a touch interaction mode with a voice interaction mode is generally only available as a business logic integration. That is, the response information for the voice command is presented via the interface. In existing human-computer interaction processes, the human-computer interactive operations that a user can trigger are still limited to the narrow human-computer interaction mode supported by the current interaction context.

BRIEF DESCRIPTION OF THE DRAWINGS

Various embodiments of the invention are disclosed in the following detailed description and the accompanying drawings.

In order to provide a clearer explanation of the technical solutions in embodiments of the present application or in the prior art, a simple introduction is given below to the drawings which are needed to describe the embodiments or the prior art. Obviously, the drawings in the description below are some embodiments of the present invention. Persons with ordinary skill in the art could, without expending creative effort, obtain other drawings on the basis of these drawings

DETAILED DESCRIPTION

Figure 1:
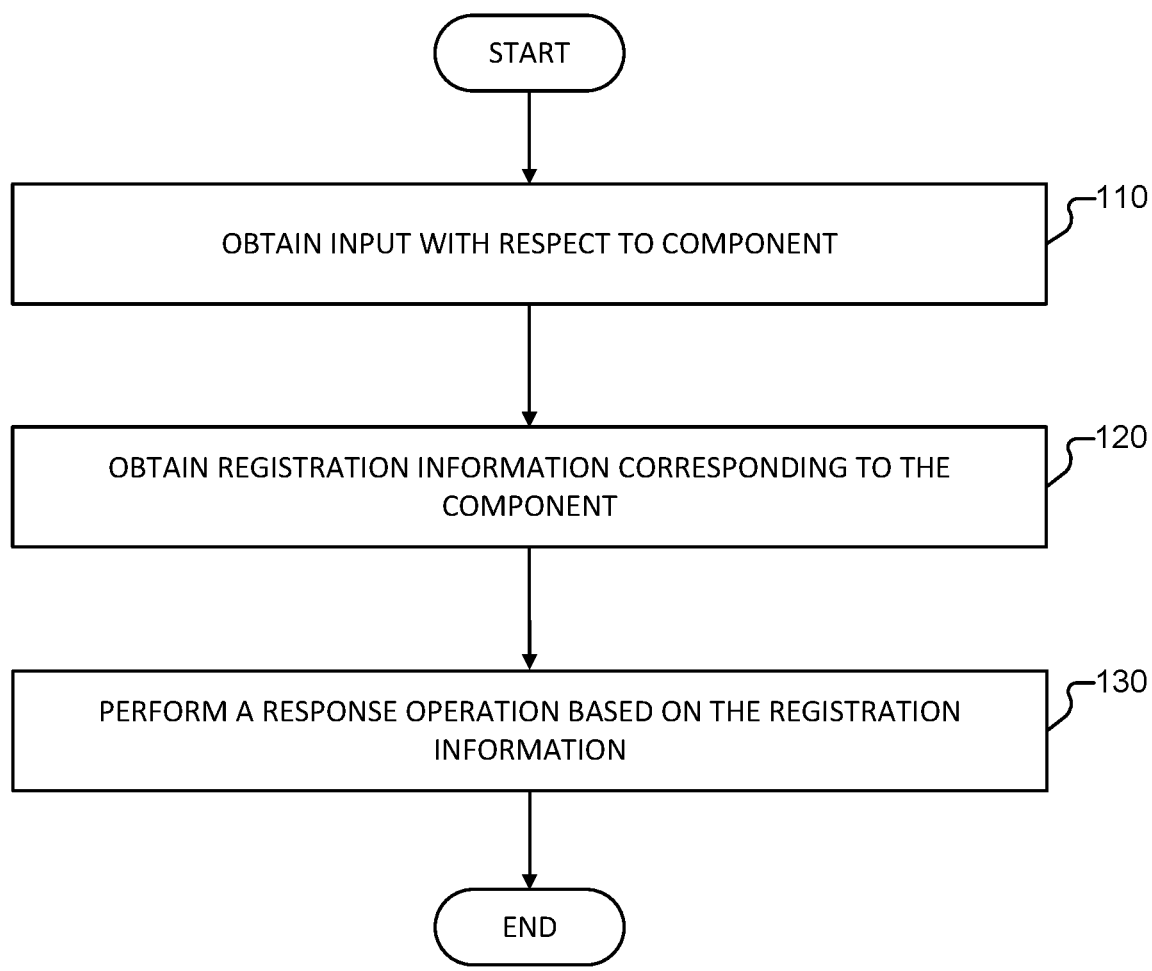
FIG. 1 is a flowchart of a method for interacting with a terminal according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Exemplary embodiments are explained in detail here, and examples thereof are shown in the drawings. When the following descriptions relate to the drawings, the same numbers in different drawings indicate the same or similar elements, except where otherwise indicated. Implementations described in the exemplary embodiments below do not represent all implementations consistent with one or more embodiments of this specification. Rather, the implementations described in the exemplary embodiments are merely examples of means and methods that are described in detail in the claims and that are consistent with some aspects of one or more embodiments of this specification.

Please note that, in other embodiments, the corresponding method steps will not necessarily be executed according to the sequence depicted and described in the present specification. The steps included in the methods of some other embodiments may be more or fewer than what are described in the present specification. In addition, a single step described in the present specification may be described as split apart into multiple steps in other embodiments, and multiple steps described in the present specification may be described as combined into a single step in other embodiments.

The terms used in embodiments of the present invention merely serve to describe specific embodiments and are not intended to restrict the present invention. "A," "said," and "the" or "this" as used in their singular form in embodiments of the present invention and the claims also are intended to encompass the plural form, unless otherwise clearly indicated by the context. "Multiple" generally encompasses at least two.

Please note that the term "and/or" used herein is merely a relationship describing related objects. It may indicate three kinds of relationships. For example, A and/or B may indicate the three situations of: only A exists, A and B both exist, and only B exists. In addition, the symbol "/" herein generally expresses an "or" relationship between the preceding and following objects.

Depending on context, the word "if" when used herein may be interpreted as "when" or "upon" or "in response to the determination that" or "in response to the detection of" Depending on the context, the phrase "upon determining" or "upon detecting (a stated condition or event)" may be understood as "when it is determined" or "in response to the determination that" or "upon detecting (a stated condition or event)" or "in response to the detection of (a stated condition or event)."

Please also note that the term "comprise" or "contain" or any of their variants are to be taken in their non-exclusive sense. Thus, products or systems that comprise a series of elements not only comprise those elements, but also comprise other elements that have not been explicitly listed or elements that are intrinsic to such products or systems. In the absence of further limitations, elements that are limited by the phrase "comprises a(n) . . . " do not exclude the existence of additional identical elements in products or systems that comprise said elements.

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In addition, the sequence of steps in each of the method embodiments described below is merely an example and does not impose strict limits.

According to various embodiments, registration information corresponding to a component being provided by the terminal (e.g., a view component) is obtained. For example, the registration information is obtained in response to a user input (e.g., to a terminal). In response to obtaining the registration information, an interaction event (e.g., a user-triggered interaction event such as a touch interaction event, a gesture interaction event, a voice interaction event, etc.) is performed. In some embodiments, in response to a user input (e.g., a touch input to a touchscreen, a voice input to a microphone, a virtual reality input, etc.), a terminal determines the registration information corresponding to a component provided on an interface. The registration information can be determined based at least in part on the component and/or the user input. In some embodiments, the registration information is determined based at least in part on an interaction mode (e.g., a mode with respect to which the input is obtained). In response to determining the registration information, the terminal can perform an interaction event. The interaction event can be determined based at least in part on the component and/or the user input. In some embodiments, the interaction event is determined based at least in part on an interaction mode. In response to determining the registration information, the terminal can perform an interaction event. The interaction event can be performed by the same module in which the user input is input (e.g., the same app for which the component is displayed), or a different module. For example, if the user input is input with respect to an app running on a terminal, the registration information can be determined by, or provided to, the operating system of the terminal, and the operating system can perform the interaction event.

According to various embodiments, the interaction event (e.g., the event to be performed in response to the user input or the obtaining of the registration information) can be determined based at least in part on a mapping of interaction events to inputs and/or components, or a mapping of interaction events to registration information and/or inputs, and/or or a mapping of interaction events to registration information, inputs, and/or interaction modes.

According to various embodiments, the terminal operates in one or more interaction modes (e.g., a touch interaction mode, a voice interaction mode, a virtual reality mode, an image/video input mode, etc.). For example, the terminal can operate a plurality of interaction modes simultaneously or contemporaneously. In response to an input with respect to a component provided by the terminal (e.g., displayed on a user interface), the terminal can determine the interaction mode with which the input is input.

The registration information can include a component identifier (e.g., a view component ID), the interaction mode (e.g., a mode with respect to which the input is obtained), or both.

FIG. 1 is a flowchart of a method for interacting with a terminal according to various embodiments of the present application.

Referring to FIG. 1, process 100 for interacting with a terminal is provided. Process 100 can implement interaction with the interface 400 of FIG. 4. Process 100 can be implemented by operating system 600 of FIG. 6, and/or computer system 700 of FIG. 7.

According to various embodiments, process 100 is implemented by one or more terminals or modules thereof. For example, process 100 is implemented by a cloud service, or an application (app), a page, a server, an operating system or background process running on a terminal, or any combination thereof.

At 110, an input is obtained. In some embodiments, an input with respect to a component provided by a terminal is obtained. The input is obtained by one or more modules or sensors on the terminal. For example, the input is obtained by a touchscreen of the terminal, a microphone connected to the terminal, a virtual reality input/output module, an image input module (e.g., an image capturing module), a video input module (e.g., a video capturing module), etc. In some embodiments, the input is obtained by a terminal (e.g., a server such as a server providing a web service to the terminal) that is remote in relation to the terminal to which the input is input by the user. For example, the user can provide an input to a mobile terminal with respect to a component provided on a graphical user interface provided by the mobile terminal. In response to receiving the input from the user, the mobile terminal can provide the input to the server, and the server can thus obtain the input. The input (or information corresponding to the input such as an indication of the input) can be communicated to the server via one or more networks.

In response to obtaining the input, the terminal (e.g., the operating system running on the terminal) determines whether the input corresponds to an interaction event with respect to an interaction mode. For example, the terminal compares the input (or one or more characteristics thereof) with information that is registered with respect to one or more interaction modes to determine whether the input corresponds (e.g., matches) to an interaction event.

The component with respect to which the input is obtained can be an element (e.g., a button, a hyperlink, an image, a menu option, etc.) provided on an interface such as a graphical user interface provided by the terminal. As an example, the component is a view component that is displayed on the interface provided by the terminal (e.g., displayed on the screen). In some embodiments, the component corresponds to a process running on the terminal.

At 120, registration information is obtained. In some embodiments, the registration information is associated with the component with respect to which the input is obtained (e.g., the component associated with the interaction event corresponding to the input). The registration information can be obtained in response to the input being obtained (e.g., in response to the interaction event being determined). The registration information can be obtained based at least in part on one or more of the input, the interaction event corresponding to the input, the component with respect to which the input is obtained, and the interaction mode (e.g., the interaction mode corresponding to the input and/or the component, and/or the interaction mode in which the terminal is operating). The registration information is obtained by the terminal at which the input is input by a user and/or a terminal to which information corresponding to the input is provided (e.g., a server providing a web service).

In some embodiments, obtaining the registration information comprises determining the registration information. For example, the registration information is obtained based at least in part on one or more of the inputs, the component through which the input is obtained, and the interaction mode. The registration information can be determined based at least in part on a mapping of interaction events to inputs or components, a mapping of interaction events to registration information or inputs, or a mapping of interaction events to registration information, inputs, or interaction modes.

The registration information comprises a component identifier (e.g., the view component ID), and an interaction event corresponding to one or more of the inputs and the component through which the inputs are obtained. As an example, the interaction event corresponds to a first interaction mode. In some embodiments, the first interaction mode is a non-touch interaction mode. The non-touch interaction mode is different from a touch interaction mode via which input is made by touch inputs in that in the non-touch interaction mode, the user does not need to touch (make physical contact with) the input device. The non-touch interaction mode can include a voice interaction mode, an image interaction mode, a virtual reality interaction mode, etc.

At 130, a response operation is performed. In some embodiments, the response operation is performed in response to the registration information being obtained. The response operation can be performed by the terminal at which the input is received or at a remote terminal such as a server providing a web service. The response operation can be a user-triggered response operation that is performed in response to a user triggering (e.g., user input via one or more interaction modes) a component.

According to various embodiments, the response operation comprises one or more of: launching or executing an application, obtaining information, providing information, saving information, requesting information pertaining to a web service, invoking a function of an app that is running on the terminal (e.g., the app with which the input is input), invoking a background process (e.g., a process executing on the operating system), launching a system control, etc.

The response operation can be performed based at least in part on the registration information. In some embodiments, the response operation is performed based at least in part on one or more of the inputs, the interaction event, the registration information, the app or process with which the input is input, etc.

In some embodiments, the registration information is predefined (e.g., pre-stored). For example, the registration information is defined by a developer (e.g., a developer of an app, the operating system, a web service, etc.), a manufacturer (e.g., the manufacturer of the terminal), a user or administrator, etc. The registration information can be stored locally or remotely at a remote storage (e.g., a storage associated with a web service, etc.). The registration information can be configurable such as by a user or administrator in accordance with preferences or settings of the user or administrator, etc. The registration information is stored in connection with one or more corresponding interaction modes and/or one or more components.

A description of process 100 and process 200 is respectively provided in the context of an app (e.g., an app running on a terminal to which the user inputs an input). Other terminals or modules of a terminal can implement process 100 and process 200. For example, at least part of process 100 and/or process 200 can be implemented in connection with services and pages.

In some embodiments, in connection with enabling an app to support at least one form of interaction with the user (e.g., one or more interaction modes), a developer registers interaction events in various interaction modes for the app by storing information in a file, a registry, or the like. The interaction events corresponding to different interaction modes can be registered. In some embodiments, a uniform event registration process and/or module is used to register interaction events corresponding to the different interaction modes. For example, with respect to a particular component (e.g., a single view component) within an app, interaction events corresponding to different interaction modes are registered in accordance with a uniform event registration model. The view component can be a button in an interface of an app. A touch interaction event corresponding to a touch interaction mode for the button can be registered. In addition or as an alternative, a voice interaction event corresponding to a voice interaction mode for the button can be registered. In addition or as an alternative, a gesture interaction event corresponding to the gesture interaction mode for the button can be registered. For example, registration information (e.g., interaction events) can be registered for a plurality of interaction modes. The registration information can be contemporaneously registered with respect to the plurality of interaction modes, or the registration information can be registered asynchronously with respect to the plurality of interaction modes. If the registration information is registered with respect to a plurality of interaction modes, then if the user wishes to tap the component (e.g., the button on the interface of the terminal) while using the app, but the user is not currently able to execute a touch operation conveniently, the user can trigger the button through a voice interaction mode or gesture interaction mode.

In some embodiments, registration of the interaction events for the app can be implemented by calling a command that is defined and stored in memory. An example of pseudo code of such an implementation can include the following:

```
var view = new View( );
view.id = "voice-view";
var voiceCommand = new VoiceCommand( ); // create a command object
voiceCommand.text = ["Hello","World"]; // specify voice command text
view.addVoiceCommand(voiceCommand); // bind voice command to the view (component)
view.on("voice", ( ) => {       // register voice event handler to process
    // insert an action/function (or a call thereto) here to handle voice event
});
```

In some embodiments, a file is used to register a command. An example of pseudo code of such an implementation can include the following:

```
voice-command.json (or xml type, etc.) :
{
   "voice-view": {
       "text": ["Hello", "World"]
   }
}
// voice-command.json includes voice command text and view (component) id. They are binded automatically.
Main.js:
var view = new View( );
view.id = "voice-view";
view.on("voice", ( ) => {
    // insert an action/function (or a call thereto) here to handle voice event
});
```

The developer can register interaction events in various interaction modes for the app by storing information in a file, a registry, or the like. As an example, in the case of a voice input (or voice command), the information stored in the file, registry, or the like can include a voice-text, a voice action, a voice-recognize rate, a component type, etc. The information pertaining to a voice text can comprise the corresponding query words. The information pertaining to a voice action can comprise a voice normal command such as select-item, select-page, next-page, forward-page, and etc. The information pertaining to a voice-recognize rate can include an implementation of fuzzy matching (or an indication to use such matching), a set matching rate, etc. The information pertaining to a component type can include information for defining the component type as a Button, a Image, a ListView, etc.

According to various embodiments, uniform event registration model can comprise or implement a component registration interaction events interface. As an example, registration of an interaction event can comprise three steps: creating an interaction command (e.g., voice command or motion command or touch recognizer), adding a command or recognizer to a component, and adding handler to process an interaction event. A component can comprise a plurality of different interaction commands. An example of javascript for interaction commands associated with a component is provided below. The button in the javascript below can corresponds to a view component. The button can handle graphical user interface (GUI) events (e.g., inputs to a GUI of the terminal), a voice event (e.g., input of a voice command, and motion event. The events can be registered by a user, administrator, and/or developer by invoking an Application Programming Interface (API) or a markup file. In some embodiments, if not all handlers are added (e.g., defined), other interaction event can trigger a base input event. For example, if base input is a touch, and a voice handler and a motion handler are not added (e.g., defined), the component will trigger tap event in response to detecting or receiving a voice operation (e.g., a voice event such as a voice input) or a motion operation (e.g., a motion event).

```
var button=new Button( );
var voiceCommand=new VoiceCommand( );
var motionCommand=new MotionCommand( );
var tapRecognizer=new TapRecognizer( );
button.addVoiceCommand(voiceCommand);
button.addMotionCommand(motionCommand);
button.addGestureRecognizer(tapRecognizer);
button.on("tap", ( )=>{ });
button.on("voice", ( )=>{ });
button.on("motion", ( )=>{ });
```

According to various embodiments, a touch operation corresponding to the touch interaction mode is an operation such as one or more taps, one or more swipes (in one or more directions), a long touch, etc. The touch operation is executed on the screen (e.g., a touchscreen of the terminal).

A gesture operation corresponding to the gesture interaction mode is generally a gesture executed in the air in front of the screen. One or more cameras or other sensors can detect or otherwise determine that a gesture is performed with respect to the component.

According to various embodiments, with respect to a view component (e.g., a component displayed on an interface of the terminal), a traditional touch interaction event can be registered, and another interaction event corresponding to a non-touch interaction mode (e.g., a voice interaction event or a gesture interaction event) can be registered. Thus, the view component may be triggered through different interaction modes.

Figure 2:
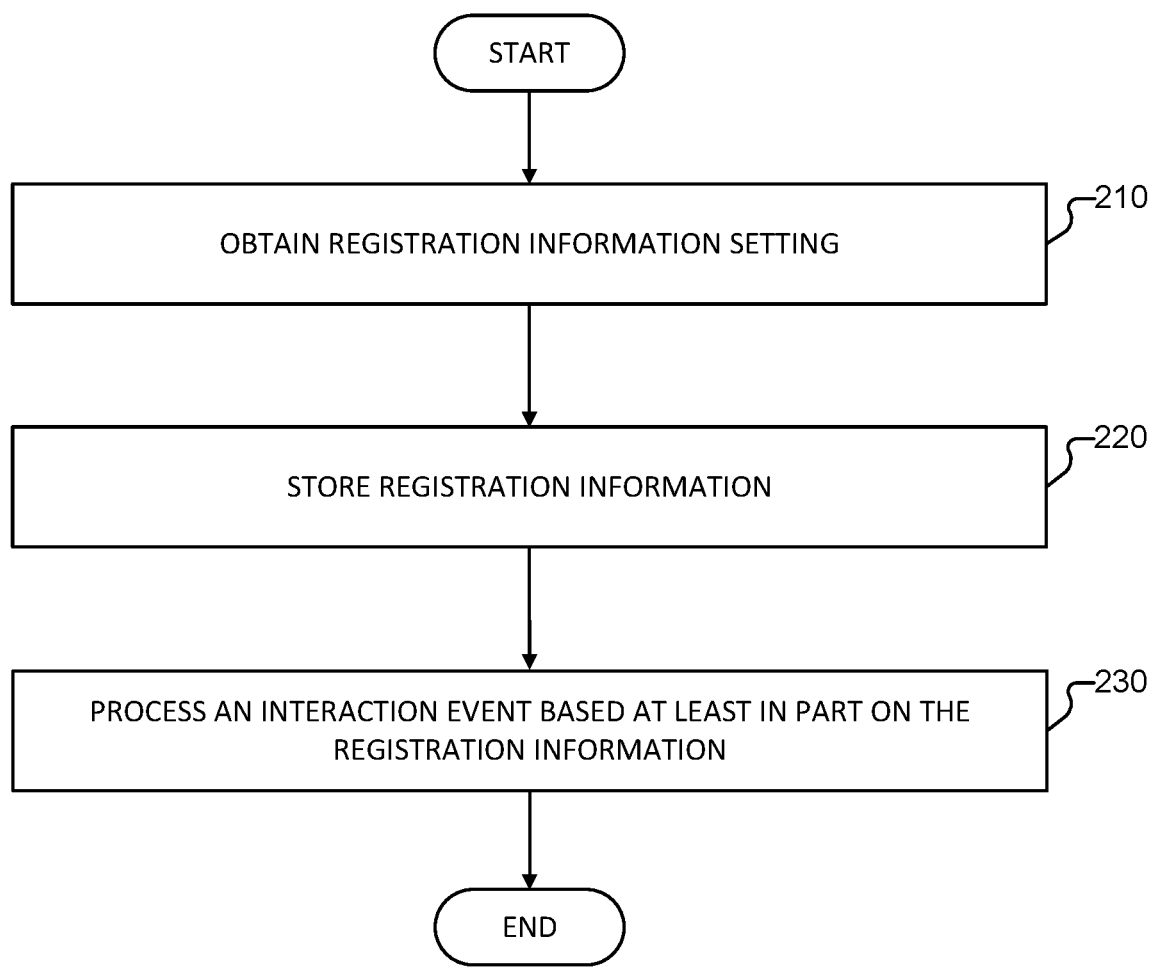
FIG. 2 is a flowchart of a method for registering an interaction event with a terminal according to various embodiments of the present application.

FIG. 2 is a flowchart of a method for registering an interaction event with a terminal according to various embodiments of the present application.

Referring to FIG. 2, process 200 for interacting with a terminal is provided. Process 200 can implement interaction with the interface 400 of FIG. 4. Process 200 can be implemented by operating system 600 of FIG. 6, and/or computer system 700 of FIG. 7.

At 210, a registration information setting is obtained. The terminal can obtain the registration information setting from a developer (e.g., a developer of an app, the operating system, a web service, etc.), a manufacturer (e.g., the manufacturer of the terminal), a user or administrator, an application package, application metadata, etc. In some embodiments, the registration information setting comprises a definition of registration information. The definition of the registration information can correspond to a standard structure to describe the interaction. For example, a "type" field is used to specify a motion such as a "wave," and a "direction" field is used to specify a direction of a weave motion such as "left," "top," "right," and "down." The registration information setting can comprise information pertaining to an interaction event such as a definition of an interaction event (e.g., with respect to one or more interaction modes). For example, the registration information setting can comprise the definitions of the touch interaction event and/or the voice interaction event registration discussed above with respect to the "btn" (e.g., the button)

At 220, the registration information is stored. In some embodiments, the terminal locally stores the registration information. However, the registration information can be stored remotely such as on a web server. In response to obtaining the registration information setting, the registration information is set such as by storing the registration information.

In some embodiments, in response to a setting of the registration information being obtained, the registration information is provided to the operating system. The operating system can set the registration information. The registration information can be stored in a mapping of interaction events to inputs and/or components, or a mapping of interaction events to registration information and/or inputs, and/or a mapping of interaction events to registration information, inputs, and/or interaction modes.

At 230, an interaction event is processed based at least in part on the registration information. In some embodiments, the terminal processes the interaction event based at least in part on the registration information. For example, in response to determining that an input is obtained (e.g., a touch input such as to a touchscreen, a voice input such as a voice command to a microphone, a gesture input such as a gesture detected by a camera), the interaction event is processed. The terminal can determine the interaction event based at least in part on the input and the registration information. For example, the terminal can determine the interaction event corresponding to the input based at least in part on a mapping of inputs to components, a mapping of interaction events and components, and/or a mapping of interaction events to registration information, inputs, and/or interaction modes.

The processing of the interaction event can comprise one or more of determining the interaction event based at least in part on the registration information, determining a response operation based at least in part on the registration information, the interaction event, and/or the interaction mode, and/or performing the response operation.

According to various embodiments, process 200 is implemented by one or more terminals or modules thereof. For example, process 200 is implemented by an operating system or background process running on a terminal, or any combination thereof.

The following example illustrates the process of registering interaction events corresponding to different interaction modes for the same view component.

According to various embodiments, for a particular button in an app, a developer can register a touch interaction event corresponding to the touch interaction mode and a voice interaction event corresponding to the voice interaction mode. The pseudocode (e.g., in JavaScript) is as follows:

Touch Interaction Event Registration:

```
var btn=new Button( );
btn.text="OK";
btn.on("tap",tap_callback);
```

Voice Interaction Event Registration:

```
var btn=new Button( );
btn.text="OK";
btn.on("voice",voice_callback);
```

In the context of the above examples of the touch interaction event registration and the voice interaction event registration, the btn.text="OK" indicates that the text content carried on the button is: OK. The text content can be regarded as a type of identifier (ID) for the button. The function btn.on( ) can be a monitoring function (e.g., that monitors whether an input is made with respect to the button, or the status of the button, etc.). The monitoring function can define one or more interaction modes, or refer to such a definition. "tap" and "voice" in the monitoring function can correspond to the tap touch interaction mode and the voice interaction mode, respectively. "tap_callback" can refer to a callback response function that is invoked in response to a determination that a top operation is input with respect to the "OK" button. "voice_callback" can refer to a callback response function invoked in response to a determination that a corresponding voice input (e.g., a voice trigger corresponding to the function) is input. As an example, in the context of a voice event (e.g., a voice input), btn.text="OK" corresponds to a context in which the user inputs the speech "OK", which can be used to trigger the button (e.g., invoke a function corresponding to an input to the button).

In the context of a touch interaction event (e.g., a touch input to the button), in response to the user inputting a tap operation on the "OK" button, the app is triggered to call the response function corresponding to a touch interaction event. In response to the call of the response function, the terminal responds accordingly (e.g., the terminal performs a corresponding operation, the app performs the corresponding function, etc.). In the context of a voice interaction event (e.g., a voice input with respect to the button or the interface), in response to the user inputting the speech "OK" button, the app is triggered to call the response function corresponding to a voice interaction event. In response to the call of the response function, the terminal responds accordingly (e.g., the terminal performs a corresponding operation, the app performs the corresponding function, etc.). Because tap_callback and voice_callback correspond to the corresponding response logic of the app (e.g., processes or functions of the app corresponding to the applicable input) associated with triggering of the button, and interaction events of different interaction modes can be registered for the same view (e.g., with respect to the same interface such as a graphical user interface), allowing the user to trigger the same component (e.g., view component) in different interaction modes occurs. For example, the tap_callback and voice_callback functions or processes have, in terms of business logic, the same business response logic.

According to various embodiments, if a touch interaction event and a voice interaction event are registered (e.g., by the developer, the user, etc.) as described in the example above, the app generates registration information corresponding to the touch interaction event and registration information corresponding to the voice interaction event. The app can store the registration information locally. In some embodiments, the app sends the generated registration information corresponding to the interaction events to the operating system. As an example, the operating system can maintain a mapping of registration information to interaction events. For example, the operating system can store mappings of the registration information to interaction events. The mappings can be stored as tables, etc.

The registration information can include one or more of registered interaction events, component IDs, and identifier(s) of the corresponding response object. For example, the ID of the corresponding response object can include an identifier of a function or process to be performed in response to the interaction event with respect to the component. In the context of the example above, the ID of the response object is the ID of the app. Accordingly, in response to the obtaining of the registration information, the corresponding response can be performed (e.g., by invoking or otherwise calling the response object corresponding to the ID of the response object included in the registration information). In some embodiments, in response to the operating system obtaining the registration information, the operating system subsequently uses the ID of the response object as a basis to send a notification to the response object indicating that the component corresponding to the interaction event (e.g., the view component) was triggered.

In some embodiments, the first interaction mode is a voice interaction mode. In the case of the first interaction mode being a voice interaction mode, the interaction event corresponding to the first interaction mode is a voice interaction event (e.g., a voice input). The voice interaction event can be speech information corresponding to the view component. For example, in response to the voice interaction event being registered, the speech information that triggers the voice interaction event may be set. Thus, the voice interaction event is invoked (e.g., triggered) in response to a determination that a user input speech matches the speech information while the interface of the voice component is being provided (e.g., displayed). The voice interaction event can be registered as text, and the terminal can convert voice input using a speech-to-text processing. In response to determining that a voice input is input, the terminal converts the voice input to text and compares the corresponding text to text registered with respect to the voice interaction event for the component.

In some embodiments, the speech information corresponds to text information displayed in relation to the component. For example, if the component is a button provided on the interface, the speech information corresponds to text included on the button. In some embodiments, the speech information corresponds to customized text information. For example, a predefined text is registered as an interaction event with respect to a component or function. The predefined text can be different from text displayed on an interface in relation to the component.

The text information displayed in relation to the component can be text information carried on the view component or text information that corresponds to the view component and that is displayed within a predefined proximity of the view component. The predefined proximity of the view component can be a distance that is within one or more distance thresholds. The predefined proximity and/or the one or more distance thresholds can be configurable such as according to user settings or preferences, or according to developer definitions or settings. As an example, if the view component is an option button, the text information can be text that is included on the option button, or the text information can be option content displayed next to the option button.

In some embodiments, the speech information corresponding to the component is defined by the developer or user. For example, a voice interaction event registered with respect to the component can be customized so that the component is triggered in response to a voice input corresponding to the speech information (or text information corresponding to the speech information).

In some embodiments, the first interaction mode is a gesture interaction mode. In the case of the first interaction mode being a gesture interaction event, the gesture interaction event can be one or more gesture interaction events. The gesture interaction event can comprise a set of one or more gesture features. The one or more gesture features can correspond to one or more defined characteristics of a gesture associated with the gesture interaction event. For example, the one or more gesture features includes a speed of a gesture, a shape of an object (e.g., a hand) used for the feature, etc. The gesture interaction event is triggered in response to a determination that a user performs a gesture. For example, the gesture interaction event is triggered in response to a determination that a user triggers a gesture operation corresponding to (e.g., matching) the gesture features. As an example, the gesture operation is performed in front of a predefined area of the terminal or one or more predefined sensors (e.g., motion sensors, cameras, RGBA camera, depth camera, infrared camera, etc.). For example, the gesture operation corresponds to a gesture performed in front of a display interface of the component (e.g., at an area in front of a screen, the area corresponding to the area of the screen on which the component is displayed). According to various embodiments, the terminal determines whether a gesture operation corresponds to the gesture features based at least in part on performing an analysis on the gesture operation. For example, the terminal performs image processing on one or more images that are obtained with respect to detection of the gesture operation. The image processing can be used for feature extraction, pattern recognition, etc. of characteristics of the gesture operation. The terminal can determine whether the gesture operation corresponds to the gesture features based on information obtained by the image processing.

Various embodiments include two types of motion gesture. A first type of motion gesture is a static motion gesture. The static motion gesture can be based on a static picture such as contents hands shape, hands position, etc. A second type of motion gesture is dynamic motion gesture. The dynamic motion gesture can be based on continuous movement, contents hands move type such as wave, pat down, grab, circular move with fingers, etc. An example of pseudo code of such an implementation can include the following:

```
class MotionGesture {
    type: string; // define motion type 'wave', 'patdown'
        velocityThreshold: number; // define wave motion
            minimum velocity
        shape: enum; // using in static motion gesture, define checked
shape such as fist, single-finger
}
```

The MotionGesture interface above, is a sample to define a motion command, using "type" field to define motion type like 'wave' or 'patdown'; using "velocityThreshold" field to define wave motion minimum velocity; using "shape" field define checked shape such as fist, single-finger and others.

```
class MotionInfo {
    type: string; // same as MotionGesture
    velocity: number; // show wave velocity
    direction: enum; // show wave direction
    finger-count: number; // the number of fingers in this motion
}
```

The MotionInfo interface above is a structure using an in motion handler which includes type, velocity, direction and finger-count. The "type" field is same as the definition in "MotionGesture". The "velocity" field is the speed for the movement. The "direction" field is the motion direction. The "finger-count" field is the number of fingers in this motion.

According to various embodiments, registration of the registration information is performed by a developer, a user, an administrator, etc. In some embodiments, the registration information is registered in connection with installation of a corresponding app. For example, registration information is obtained based at least in part on an installation package of an app, and the registration information is registered (e.g., stored locally and/or provided to the operating system). The registration information can be obtained (e.g., extracted) from the installation package. As an example, in response to a determination that installation of the app is successful, the registration information is determined from the installation packet, and the registration information is registered (e.g., provided to the operating system).

According to various embodiments, the terminal (e.g., the operating system) determines that a trigger action is performed (e.g., by the user) with respect to a component provided by an interface of the terminal. The operating system can determine the trigger actions performed in connection with one or more interaction modes for which corresponding events are registered. The terminal determines that a trigger action is performed based at least in part on the registration information. In response to determining that a trigger action is performed, the terminal can determine a component with respect to which the trigger action is performed, and the terminal performs a corresponding response operation (e.g., launching an app, invoking a function, providing information, etc.) based at least in part on the component with respect to which the trigger action is performed.

Processing that occurs after the operating system receives the registration information sent by the app and the processing of interaction events triggered by the user are described further below.

Figure 3:
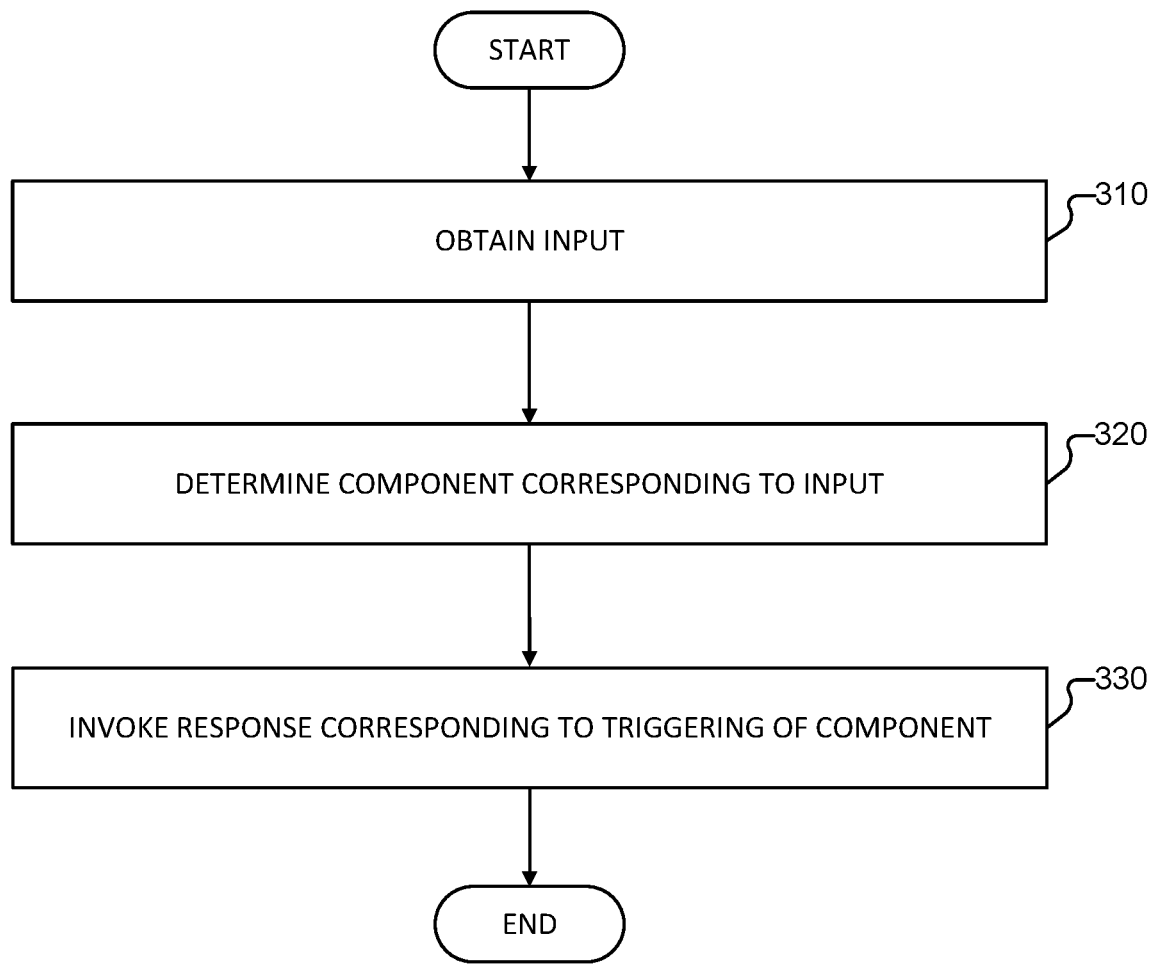
FIG. 3 is a flowchart of a method for interacting with a terminal according to various embodiments of the present application.

FIG. 3 is a flowchart of a method for interacting with a terminal according to various embodiments of the present application.

Referring to FIG. 3, process 300 for interacting with a terminal is provided. Process 300 can implement interaction with the interface 400 of FIG. 4. Process 300 can be implemented by operating system 600 of FIG. 6, and/or computer system 700 of FIG. 7.

According to various embodiments, process 300 is implemented by one or more terminals or modules thereof. For example, process 300 is implemented by an operating system or background process running on a terminal, or any combination thereof.

At 310, an input is obtained. In some embodiments, an input with respect to a component provided by a terminal is obtained. The input is obtained by one or more modules on the terminal such as the operating system running on the terminal. The input can be obtained based at least in part on information obtained by one or more sensors of the terminal. For example, in various embodiments, the input is obtained by a touchscreen of the terminal, a microphone connected to the terminal, a virtual reality input/output module, an image input module (e.g., an image capturing module), a video input module (e.g., a video capturing module), etc.

In response to obtaining the input, the terminal (e.g., the operating system running on the terminal) determines whether the input corresponds to an interaction event with respect to an interaction mode. For example, the terminal compares the input (or one or more characteristics thereof) with information that is registered with respect to one or more interaction modes to determine whether the input corresponds (e.g., matches) to an interaction event.

According to various embodiments, the terminal obtains an interaction event corresponding to a first interaction mode. For example, the terminal obtains the interaction event based at least in part on the input (e.g., in response to determining that the input corresponds to the interaction event). The first interaction mode can be a non-touch interaction mode (e.g., a voice interaction mode, a virtual reality interaction mode, etc.).

At 320, a component corresponding to the input is determined. In some embodiments, the terminal (e.g., the operating system or app running on the terminal) determines the component with which the input is associated. For example, in response to determining the interaction event based at least in part on the input, the terminal determines the component with which the interaction event is associated. The terminal determines the component that is triggered. For example, the terminal determines the component to which the interaction event is input or intended to be input by the user. The terminal can determine the component that is triggered based on a location of an input (e.g., compare the location to a location mapped to a component provided on an interface), text information mapped to the component (e.g., comparing text information obtained based at least in part on the input to text information mapped to the component), a component background color (e.g., for a command such as "Select the red button"), a component shape (e.g., for a command such as "Select the circle button"), a component position (e.g., for a command such as "Select the left top button"), a component inclusive relation or relative location (e.g., for a command such as "Select the button inner List"), etc.

At 330, a response operation corresponding to the triggering of the component is invoked. In some embodiments, the terminal (e.g., the operating system or an app running on the terminal) invokes the response operation corresponding to the triggering of the component. The invoking of the response operation can include determining the response operation corresponding to the component and/or the input.

For example, the response can be determined based at least in part on one or more of: the component, the trigger event, and the interaction mode.

According to various embodiments, the response operation comprises one or more of: launching or executing an application, obtaining information, providing information, saving information, requesting information pertaining to a web service, invoking a function of an app that is running on the terminal (e.g., the app with which the input is input), invoking a background process (e.g., a process executing on the operating system), launching a system control, etc.

The response operation can be performed by the terminal at which the input is received or at a remote terminal such as a server providing a web service. The interaction event can be a user-triggered interaction event that is performed in response to user triggering (e.g., user input via one or more interaction modes).

In response to the input and/or determining that a component has been triggered in connection with the input (e.g., that an interaction event occurred), an indication is provided that the component has been triggered. For example, the indication can be provided to the operating system of the terminal. In response to receiving the indication that the component has been triggered (e.g., by the interaction event), a corresponding response operation can be performed. For example, the indication that the component has been triggered provides notification of the need to respond in relation to a function corresponding to the component.

According to various embodiments, at the time that the input is received (e.g., from the user), registration information has been stored with respect to one or more interaction events and/or one or more interaction modes. For example, the operating system has already stored registration information for interaction event(s) registered with respect to the component associated with a cloud service, or an application (app), a page, a server, an operating system or background process running on a terminal, or any combination thereof. In addition to storing registration information for interaction events corresponding to the touch interaction mode, registration information for interaction events corresponding to one or more non-touch interaction modes (e.g., a voice interaction mode, a virtual reality interaction mode, etc.) is stored. For example, the operating system stores registration information for a first interaction mode, wherein the first interaction mode is a non-touch interaction mode.

A description of process 300 is provided in the context of an app. Suppose that, when a user is using the app, the current interface (e.g., a graphical user interface of the app) displays a view component that the user wishes to trigger. At this point, the user can trigger the interaction event for this view component through a first interaction mode. For example, the user can trigger the view component with an interaction event associated with a first interaction mode such as a voice interaction mode, a virtual reality interaction mode, etc. The user can invoke the interaction event by inputting an input with respect to the view component.

A voice interaction mode is used as an example of the first interaction mode in the present example. Thus, the aforesaid interaction event corresponding to the first interaction mode is a voice interaction event.

The input corresponding to the voice interaction event can be input based on a user speaking the text information associated with the view component. For example, the text information associated with the view component can be the text information provided (e.g., displayed) on the view component on the interface if the voice interaction event corresponds to such text information. As another example, the text information associated with the view component corresponds to predefined information that is mapped to the view component. The mapping of the predefined information to the view component can be stored in connection with the registration information. Thus, a voice command comprising the text information is triggered.

After the operating system receives the voice command or a determination that the voice command is triggered (e.g., based at least in part on the voice input), the operating system determines (e.g., identifies) the text information therein and uses the registration information stored with respect to the view components as a basis to determine the view component for which the text information is registered as a voice interaction event. As an example, the corresponding component to be triggered based on the voice interaction event is determined based on a mapping of registration information to text information. The component can be determined based at least in part on a mapping of text information to components. Other processes or apps running on the terminal can determine the component based at least in part on the voice command or text information.

In some embodiments, the operating system uses the voice interaction mode and the recognized text information as keywords to look up within the stored registration information the registration information that comprises the corresponding voice interaction event. In response to determining the registration information corresponding to the voice interaction event, the component associated with the voice interaction event can be determined based at least in part on the registration information. For example, an identifier associated with a context in which the input is made (e.g., the context in which the voice interaction event is input) can be used to determine the component associated with the voice interaction event. The identifier associated with a context in which the input is made can be mapped to an identifier of a component on an interaction event-by-interaction event basis. The context in which the input is made can comprise an application, a function, an interface, a terminal to which the input is input, a web service, etc. In some embodiments, the identifier associated with a context in which the input is made and the component identifier comprised in the retrieved registration information is used as a basis to determine the component in the corresponding context (e.g., app, process, web service, interface, etc.). In response to determining the component with which the voice interaction event is associated, the terminal (e.g., the operating system) sends an indication that the component is triggered. For example, the indication that the component is triggered can be sent to the corresponding context (e.g., the app with which the voice interaction event is input, the interface being displayed, a web service being executed, etc.). The indication can provide a notification to the corresponding context that the view component has been triggered.

In some embodiments, registration information comprises one or more mappings of voice interaction events to components, and/or mappings of voice interaction events to text information. In response to a determination that multiple pieces of registration information corresponding to the voice interaction event are identified, then the operating system determines a response operation and/or a context within which a response to the interaction event is to be provided. For example, the operating system determines the response or the context within which the response is to be provided from among multiple contexts (e.g., apps, processes, functions, interfaces, web services, etc.) based on the run statuses of the contexts corresponding to each of the pieces of registration information and/or based on screen window occupation information. For example, the operating system determines that the target context (e.g., within which a response to the interaction event is to be provided) corresponds to the last of multiple contexts that have run.

In some embodiments, in response to obtaining a voice command, the operating system determines the context for which the voice command is associated (e.g., the context for which the user intends to input the command) based at least in part on information on screen window occupation. For example, the operating system determines the context for which the voice command is associated as corresponding to the last occupied screen window. In response to determining the context for which the voice command is associated, the operating system determines the component (e.g., the view component) registered for the voice interaction event (e.g., the event corresponding to the voice command) based at least in part on the registration information corresponding to the context for which the voice command is associated.

According to various embodiments, in response to determining the component that is triggered in connection with the interaction event, a response operation is performed. In response to determining the component registered for the voice interaction event corresponding to the voice command in the context for which the voice command is associated, the operating system sends an indication to the context for which the voice command is associated to notify the context that the component was voice triggered. In response to receiving the indication, the context can perform the corresponding response operation associated with the triggering of the component.

According to various embodiments, the response operation comprises one or more of: launching or executing an application, obtaining information, providing information, saving information, requesting information pertaining to a web service, invoking a function of an app that is running on the terminal (e.g., the app with which the input is input), invoking a background process (e.g., a process executing on the operating system), launching a system control, etc.

Figure 4:
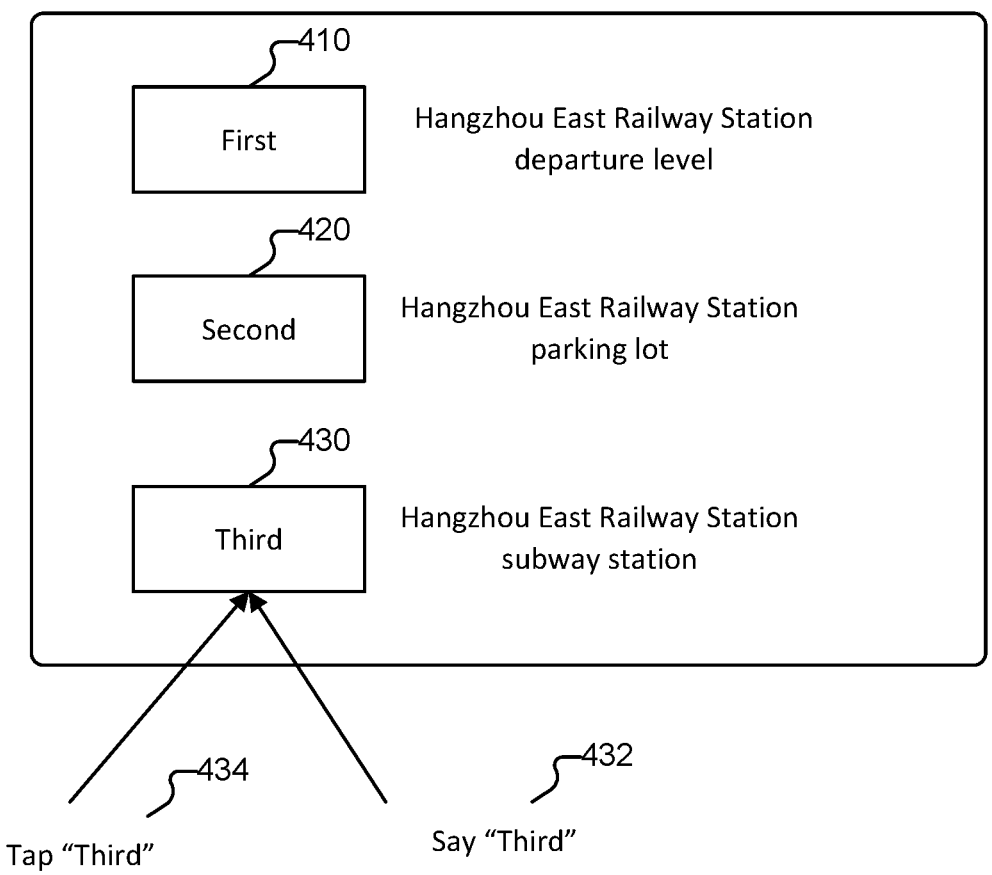
FIG. 4 is a diagram of an interaction with an interface in a navigation context according to various embodiments of the present application.

FIG. 4 illustrates an example in which the context for which the interaction event is associated is a navigation app.

FIG. 4 is a diagram of an interaction with an interface in a navigation context according to various embodiments of the present application.

Referring to FIG. 4, interface 400 in a navigation context is provided. Interface 400 can be implemented in connection with process 100 of FIG. 1, process 200 of FIG. 2, process 300 of FIG. 3, and/or process 500 of FIG. 5. Interface 400 can be implemented by operating system 600 of FIG. 6, and/or computer system 700 of FIG. 7.

As illustrated in FIG. 4, interface 400 pertains to a navigation destination selection interface. Interface 400 includes three components (e.g., three buttons) 410, 420, and 430. Components 410, 420, and 430 are selectable (e.g., configured to be capable of triggering based on an input). For example, components 410, 420, and 430 can be triggered in response to an interaction event. As illustrated in FIG. 4, each of components 410, 420, and 430 pertains to a different destination selection (e.g., to which the app can be navigated). The selection interface corresponding to interface 400 provides three destinations, each of which corresponds to a selection button (e.g., a component). The first selection button corresponding to component 410 includes the text for "first" displayed thereon, the second selection button corresponding to component 420 includes the text for "second" displayed thereon, and the third selection button corresponding to component 430 includes the text for "third" displayed thereon. For each selection button (e.g., components 410, 420, and 430), interaction events are registered in two interaction modes: a touch interaction event corresponding to the touch interaction mode and a voice interaction event corresponding to the voice interaction mode. Thus, each component can be triggered via the touch interaction mode or the voice interaction mode. For example, as illustrated at 434, the user can perform a tap operation on a particular selection button (e.g., component 430) to trigger that selection button. In response to the tap operation, the navigation app (e.g., the app or context that provides interface 400) uses the destination corresponding to the tapped selection button as the navigation destination for navigation route planning. As an example, component 430 is mapped to a particular destination such as a page providing information pertaining to "Hangzhou East Railway Station" or "subway station." The mapping of component 430 to the destination can be stored in the corresponding registration information. In response to component 430 being invoked by the tap operation, the corresponding response operation is performed. For example, the navigation app (e.g., the app or context that provides interface 400) navigates to a destination (e.g., to which the component is mapped in the registration information, etc.) such as the page providing information pertaining to "Hangzhou East Railway Station, subway station" or "subway station." As another example, a voice input (e.g., a voice command) can be input. The voice input can correspond to a voice interaction event. For example, the speech information contained in the voice interaction events (or text information corresponding to text determined based on a speech-to-text conversion of the voice interaction event) that are registered in relation to the selection buttons corresponds to the text associated with the selection buttons. The text associated with the selection buttons can correspond to the text provided on the selection buttons (e.g., "first" for component 410, "second" for component 420, or "third" for component 430). In some embodiments, other defined text can be associated with the selection buttons. For example, the text "Hangzhou East Railway Station, departure level" or "departure level" can be associated with component 410 (e.g., such text can be associated with component 410 via the corresponding registration information). As another example, the text "Hangzhou East Railway Station, parking lot" or "parking lot" can be associated with component 420. As another example, the text "Hangzhou East Railway Station, subway station" or "subway station" can be associated with component 430. Thus, the user may say the text on the selection button or the other text associated with the corresponding selection button (e.g., "departure level," "parking lot," "subway station," etc.) that the user intends to select so as to trigger a voice interaction event. In response to the tap operation or the voice command, the navigation app therefore conducts navigation route planning using the destination corresponding to the target selection button as the navigation destination.

In the context of FIG. 3, the terminal provides interface 400 that includes three components (e.g., three buttons) 410, 420, and 430. Components 410, 420, and 430 are selectable (e.g., configured to be capable of triggering based on an input). For example, components 410, 420, and 430 can be triggered in response to an interaction event. At 310, the terminal obtains voice input 432 or touch input 434. At 320, the terminal determines the component, among components 410, 420, and 430, that is to be triggered based on the voice input 432 or touch input 434. For example, the terminal determines that component 430 is triggered based on the voice input 432 or touch input 434. In response to determining that component 430 is triggered, at 330, a response corresponding to the triggering of the component (e.g., component 430) is invoked. For example, a navigation app therefore conducts navigation route planning using the destination corresponding to the target selection button as the navigation destination.

In summary, registration of interaction events in different interaction modes for any one component expands a single component into one having multiple interaction modes. The user thus can trigger the same component through different interaction modes to increase the convenience of human-machine interaction.

Figure 5:
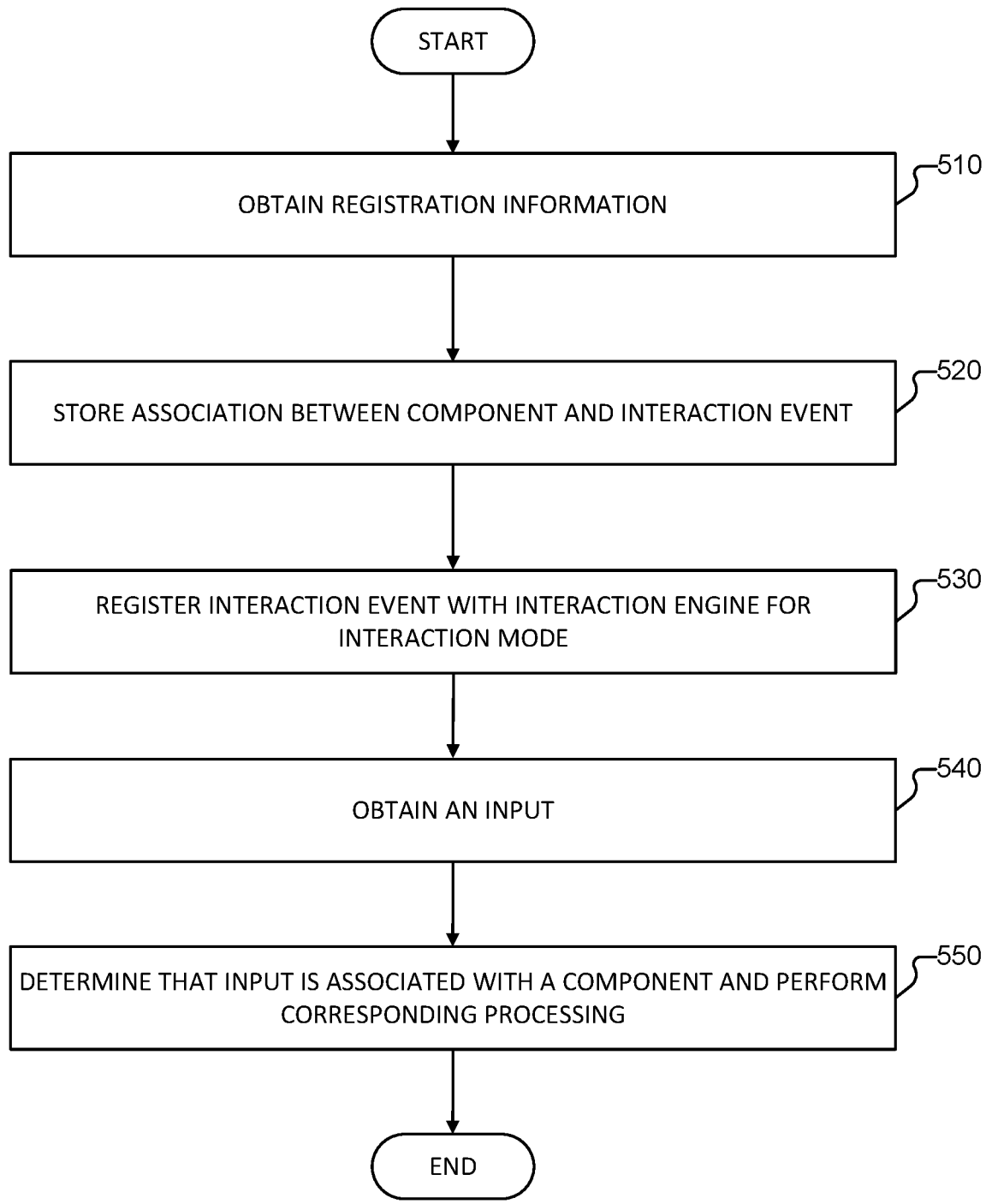
FIG. 5 is a flowchart of a method for interacting with a terminal according to various embodiments of the present application.

FIG. 5 is a flowchart of a method for interacting with a terminal according to various embodiments of the present application.

Referring to FIG. 5, process 500 for interacting with a terminal is provided. Process 500 can implement interaction with the interface 400 of FIG. 4. Process 500 can be implemented by operating system 600 of FIG. 6, and/or computer system 700 of FIG. 7.

At 510, registration information is obtained. In some embodiments, the terminal obtains the registration information. For example, the operating system obtains registration information with respect to a component (e.g., a component that is to be displayed such as with a context). The registration information can be obtained from a web server, a developer, an application installation package, an application, or a user definition or preferences. According to various embodiments, the registration information comprises an interaction event corresponding to a first interaction mode and the identifier associated with the component (e.g., view component ID). The first interaction mode can be a non-touch interaction mode.

At 520, an association between the component and the interaction event is stored. In some embodiments, the terminal stores the registration information in response to obtaining the registration information. For example, the terminal stores the registration in a manner that associates the interaction event with the identifier associated with the component. The terminal can store a mapping of component identifiers to interaction events.

At 530, the interaction event is registered in association with the interaction mode. In some embodiments, the terminal (e.g., the operating system) registers the interaction event with the interaction engine for the corresponding interaction mode. For example, the operating system uses the registration information associated with an interaction event to associate the interaction event with the interaction mode. Registration of the interaction event with the interaction engine can comprise providing the interaction engine with an indication that the interaction event is defined with respect to an input.

In some embodiments, the component identifier comprises text information such as text information included (e.g., displayed on) on the component. In some embodiments, the component identifier comprises position information of the component within the interface.

In some embodiments, the interaction mode for which an interaction event is registered (e.g., the first interaction mode) corresponds to a voice interaction mode. A voice interaction mode can correspond to a mode in which inputs are input to the terminal via voice input. The voice input can be input via a microphone of the terminal (or connected to the terminal). In some embodiments, the voice interaction mode operates to convert voice inputs to text information based on a speech-to-text processing. The interaction event in accordance with the voice interaction mode can comprise speech information corresponding to the component. For example, the speech information is trigger information for triggering the interaction event. A user can trigger a component (e.g., select a component or invoke a function corresponding to a component) by inputting a predefined speech information associated with (e.g., mapped to) the component. In some embodiments, the speech information comprises text information displayed in relation to the component (e.g., in the case of the component being a button, the text information can be displayed on the button on the interface), or the speech information corresponds to customized text information (e.g., predefined text information that is mapped to the component).

In some embodiments, the interaction mode for which an interaction event is registered (e.g., the first interaction mode) corresponds to a gesture interaction mode. A gesture interaction mode can correspond to a mode in which inputs are input to the terminal via a gesture such as a motion of a user's hands. The gesture input can be input via a user performing a gesture within proximity of one or more sensors such as cameras. The proximity can correspond to an area within which the one or more sensors detect motion or presence. In some embodiments, the gesture interaction mode operates to convert gesture inputs to information such as movement information based on image processing or the like. In some embodiments, the interaction event includes set gesture features (e.g., characteristics pertaining to a gesture that are pre-defined). The gesture features are trigger information for triggering the interaction event.

In response to receiving the registration information, the operating system stores the correspondence between the component and the interaction event (e.g., stores a mapping of the registration information such as a mapping of components to interaction events). In addition, in response to receiving the registration information, the operating system registers the corresponding interaction event with an interaction engine corresponding to the first interaction mode. Registration of the interaction event with the interaction engine corresponding to the first interaction mode enables the interaction engine to recognize whether a user interaction triggered an interaction event. For example, in response to receiving an input (e.g., information obtained by one or more sensors), the interaction engine compares information corresponding to the input to registered interaction events to determine whether an interaction event occurred (e.g., whether a user interaction triggered an interaction event).

At 540, an input is obtained. In some embodiments, the terminal obtains an input based on information obtained by one or more sensors of the terminal (or connected to the terminal). In response to receiving the input, the terminal determines whether an interaction event is associated with the input. For example, the terminal (e.g., the operating system) determines whether the input corresponds to the occurrence of an interaction event based at least in part on the registration information. The terminal can determine the interaction event corresponding to the input. For example, the interaction event is determined based at least in part on the registration information.

According to various embodiments, in response to obtaining an interaction event corresponding to the first interaction mode, the terminal (e.g., the operating system) determines the component corresponding to the interaction event. For example, the terminal determines the component based at least in part on the registration information. The terminal can determine a context (e.g., app, interface, etc.) in which the interaction event is triggered and determine the component in the context that is being triggered.

In some embodiments, obtaining an interaction event corresponding to the first interaction mode comprises receiving a user-triggered interaction via an interaction engine corresponding to the first interaction mode and determining that the user-triggered interaction corresponds to an interaction event, and determining that an interaction event was triggered.

For example, in the case of the first interaction mode being a voice interaction mode, the user-triggered interaction comprises the user inputting (e.g., speaking) a piece of speech, and the voice interaction engine receiving and recognizing the piece of speech, determining that the speech content corresponding to the piece of speech matches a registered voice interaction event, and thereupon determining the voice component corresponding to the voice interaction event (e.g., determining which voice component has registered the voice interaction event). Specifically, registration information corresponding to each view component may serve as a basis to determine the component for which the voice interaction event has been registered.

At 550, the component with which the input is associated is determined and a corresponding processing is performed. In some embodiments, the terminal determines that a detected input corresponds to an interaction event based at least in part on the registration information (e.g., a context in which the input is input, a type or characteristic of the input, etc.). For example, the terminal determines that an interaction event occurred. In connection with determining the interaction event, the terminal determines the component with which the interaction event is associated (e.g., the component that the user is intending to trigger or invoke). The terminal can determine the component with which the interaction event is associated based at least in part on the registration information (e.g., the registration information corresponding to the context in which the interaction event occurs, and the type or characteristic(s) of the input). In response to determining the component corresponding to the interaction event, an indication indicating that the component is triggered is provided. As an example, the indication that the component is triggered can be sent to the corresponding context (e.g., the app with which the voice interaction event is input, the interface being displayed, a web service being executed, etc.). The indication can provide a notification that the component has been triggered. According to various embodiments, in response to receiving the notification that the component is triggered, a response operation is performed. For example, the operating system (or the corresponding interaction engine) determines a response operation and/or a context within which a response to the interaction event is to be provided. The response operation can thereafter be performed.

Registration information pertaining to a component comprises the ID of the context within which a response to the interaction event is to be provided (e.g., an identifier of an app, an identifier of an interface, an identifier of a page, an identifier of a service, an identifier of a function, etc.), and the ID of the context serves as a basis for sending a notification to the context corresponding to the component associated with the interaction event for a first interaction mode and that was registered in relation to the component that the component has been triggered, thus causing the context that is determined to provide a response to call the response processing logic corresponding to the interaction event so that a response is provided (e.g., the response processing logic performs or calls a function to perform the response operation).

According to various embodiments, a developer (e.g., an app or service developer) or an administrator can use a unified interaction event registration model in connection with registering interactions (e.g., interaction events) corresponding to different interaction modes for the same component and thus expand the interaction modes with which a component can be triggered (e.g., expand the ways by which the user can interface with a component). Accordingly, a user can interact with a component using the traditional touch mode and non-touch modes such as voice. The ability of a user to interact with the component using the traditional touch mode and non-touch modes such as voice increases the interactive flexibility of components, enabling users to interact using different interaction modes as needed.

Figure 6:
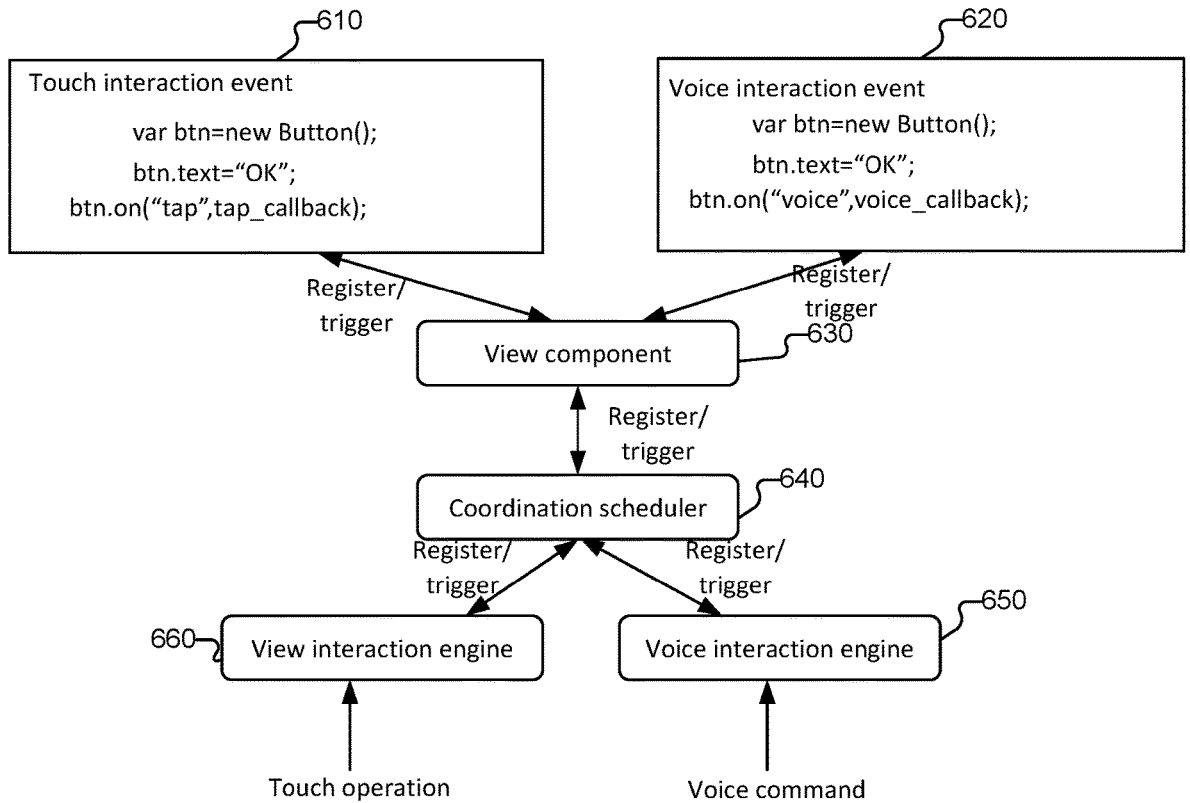
FIG. 6 is a diagram of an operating system according to various embodiments of the present application.

FIG. 6 is a diagram of an operating system according to various embodiments of the present application.

Referring to FIG. 6, operating system 600 is provided. Operating system 600 can implement at least part of process 100 of FIG. 1, process 200 of FIG. 2, process 300 of FIG. 3, and/or process 500 of FIG. 5. Operating system 600 can implement interaction with the interface 400 of FIG. 4. Operating system 600 can be implemented by, or interface with, computer system 700 of FIG. 7.

As illustrated in FIG. 6, operating system 600 stores, or has access to, interaction event definitions. For example, operating system 600 stores, or has access to, touch interaction event 610 and voice interaction event 620. Touch interaction event 610 can define an interaction event that is invoked based on an input such as a touch input to a touchscreen (or a corresponding view interaction engine such as view interaction engine 660). Voice interaction event 620 can define an interaction event that is invoked based on an input such as a voice input to a microphone (or a corresponding voice interaction engine such as voice interaction engine 650). According to various embodiments, the interaction event defined by the touch interaction event definition of 610 and the interaction event defined by the voice interaction event 620 correspond to interaction events that are invoked in different interaction modes (e.g., a touch interaction mode and a voice interaction mode) but that are associated with a same component (e.g., the same component/element provided on the interface).

As shown in FIG. 6, operating system 600 can be logically divided into a view component (View) 630, a coordination scheduler (Interaction Manager) 640, and various interaction engines, such as the view interaction engine (GUI Engine) 660 and voice interaction engine (Voice Engine) 650.

In some embodiments, the various interaction engines at least include an interaction engine corresponding to a first interaction mode. The first interaction mode is a non-touch interaction mode for receiving an interaction event corresponding to the first interaction mode.

Coordination scheduler 640 is configured to determine the component (e.g., the view component) 630 corresponding to the received interaction event and to send a notification that the component 630 has been triggered so as to provide notification of the need to respond in relation to a function corresponding to view component 630 (e.g., to indicate that a corresponding response operation is to be performed).

As an illustrative example, if the context that is to provide the response is determined to be an app, the app can register interaction events with respect to interaction modes for the same component. As shown in FIG. 6, a touch interaction event 610 and a voice interaction event 620 are registered for the same component—the "OK" button. In response to receiving registration information relating to different interaction events for the component 630, the coordination scheduler 640 can register the touch interaction event 610 with the view interaction engine 660 and can register the voice interaction event 620 with the voice interaction engine 650.

In response to a user triggering a touch action for the view component (e.g., the user inputting a touch input), the view interaction engine 660 determines whether the touch input corresponds to a touch interaction event based at least in part on the registered touch interaction events (e.g., the touch interaction events registered with the view interaction engine). If the view interaction engine 660 determines that the touch input corresponds to a registered touch interaction event, the view interaction engine 660 informs the coordination scheduler 640. The coordination scheduler 640 determines the corresponding component 630 and app based on the registration information for all touch interaction events (e.g., a mapping of touch interaction events to components) and then sends notification of the fact that the touch interaction event was triggered on the component 630 to the app. The app responds on the basis of the response process logic (tap_callback) corresponding to the touch interaction event 610. For example, the app performs a response operation in response to receiving the indication that the touch interaction event 610 is triggered with respect to component 630.

Similarly, in response to a user triggering a voice command directed at (e.g., with respect to) the component 630, the voice interaction engine 650 determines whether the touch input corresponds to a voice interaction event based at least in part on the registered voice interaction events. If the voice interaction engine 650 determines that the voice command corresponds to a registered voice interaction event, the voice interaction engine 650 informs the coordination scheduler 640. The coordination scheduler determines the corresponding view component and app based on the registration information for all voice interaction events (e.g., a mapping of voice interaction events to components). The coordination scheduler 640 then sends notification of the fact that the voice interaction event was triggered on the component 630 to the app. The app responds on the basis of the response process logic (voice_callback) corresponding to the voice interaction event 620. For example, the app performs a response operation in response to receiving the indication that the voice interaction event 620 is triggered with respect to component 630.

Figure 7:
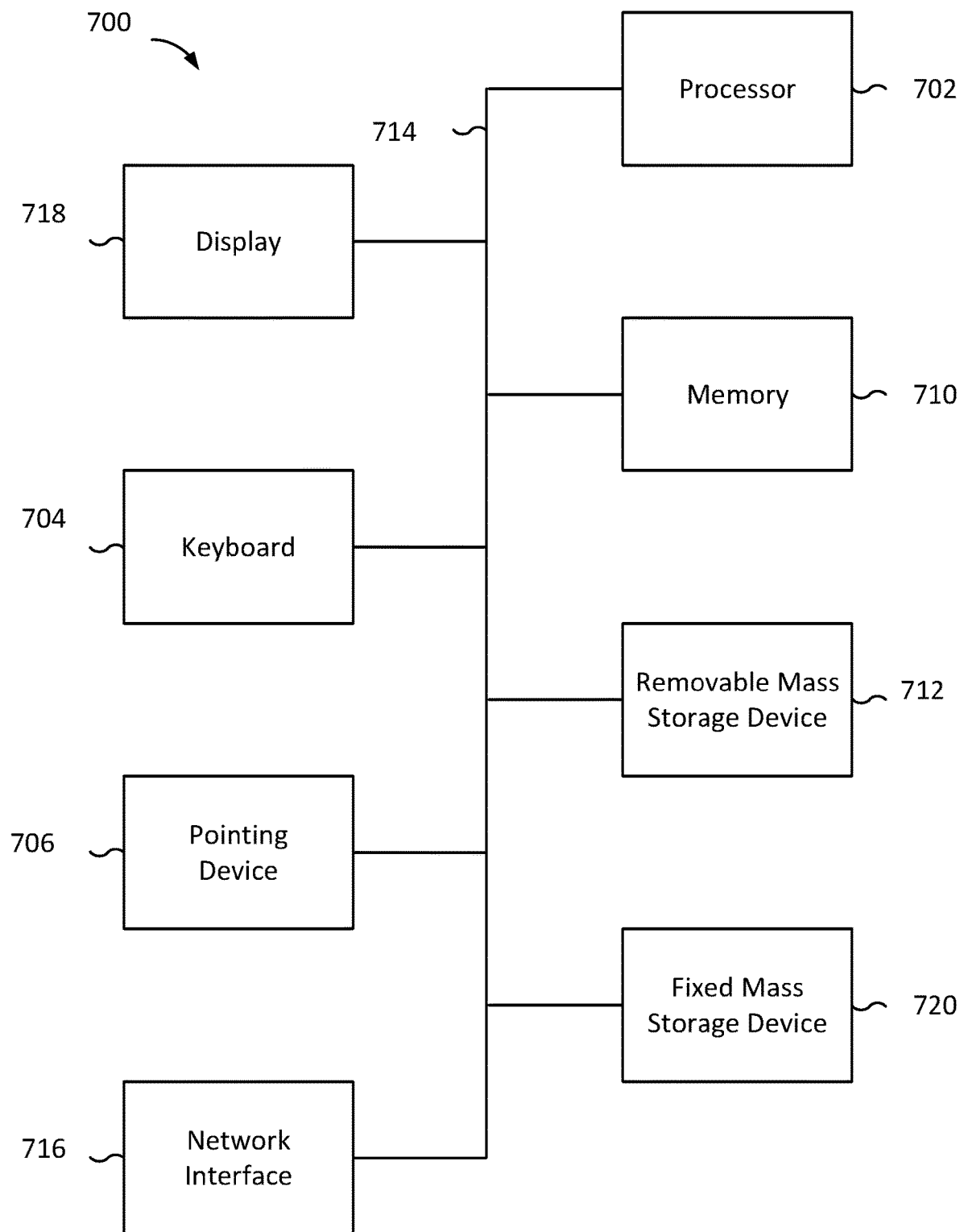
FIG. 7 is a functional diagram of a computer system for communication according to various embodiments of the present application.

FIG. 7 is a functional diagram of a computer system for communication according to various embodiments of the present application.

Referring to FIG. 7, computer system 700 is provided. Computer system 700 can implement at least part of process 100 of FIG. 1, process 200 of FIG. 2, process 300 of FIG. 3, interface 400 of FIG. 4, process 500 of FIG. 5, and/or operating system 600 of FIG. 6.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

The means embodiments described above are merely for the purpose of example. The units described therein as separate components may or may not be physically separate, and components displayed as units may or may not be physical units. They can be located in one place, or they can be distributed across multiple network units. Some or all of the modules herein may be chosen according to actual need to achieve the objectives of the present embodiments. A person with ordinary skill in the art may understand and implement them without expending creative effort.

Through descriptions of the above implementations, persons skilled in the art can clearly understand that the implementations may be realized with the necessary general-use hardware platform. Of course, they may also be realized through combinations of hardware and software. On the basis of such an understanding, the technical scheme described above, whether essentially or in those parts that contribute to the prior art, may be embodied in the form of computer products. The present invention may take the form of one or more computer program products implemented on computer-usable storage media (including but not limited to magnetic disk memory, CD-ROM, and optical memory) containing computer-usable program code.

The present invention is described with reference to flow charts and/or block diagrams based on methods, equipment (systems) and computer program products of the present invention. Please note that each process and/or block within the flowcharts and/or block diagrams and combinations of processes and/or blocks within the flowcharts and/or block diagrams can be implemented by computer instructions. These computer program instructions can be provided to general-purpose computers, special-purpose computers, embedded processors, or processors of other human-machine interaction devices to give rise to a machine, with the result that the instructions executed by the processors of computers or other programmable human-machine interaction devices give rise to means used to implement the functions specified in one or more processes in a flowchart and/or in one or more blocks in a block diagram.

These computer program instructions can also be stored in computer-readable memory that can guide computers or other programmable human-machine interaction devices to operate according to specific modes, with the result that the instructions stored in this computer-readable memory give rise to products that include instruction means. These instruction means implement the functions specified in one or more processes in a flow chart and/or one or more blocks in a block diagram.

These computer program instructions can also be loaded onto a computer or other programmable human-machine interaction device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computing device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

The final point that should be explained is the following: the above embodiments only serve to explain the technical schemes of the present invention and not to limit it. Although the present invention was explained in detail with reference to the above-described embodiments, persons skilled in the art should understand that they may modify the technical schemes recorded in the various embodiments described above or provide equivalent substitutions for some of their technical features. Yet these modifications or substitutions do not cause the corresponding technical schemes to substantively depart from the spirit and scope of the technical schemes of the various embodiments of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by a terminal, an input, wherein the input is obtained by one or more interaction engines running on the terminal;
    determining, by the terminal, that the input corresponds to an interaction event in a first interaction mode, the first interaction mode being a non-touch interaction mode, wherein the determining that the input corresponds to the interaction event in the first interaction mode comprises:
  receiving, by a coordination scheduler running on the terminal, the input from the one or more engines running on the terminal;
  determining, by the coordination scheduler, the one or more interactive engines from which the input is received; and
  determining, by the coordination scheduler, that the input is in accordance with the first interaction mode based at least in part on a determination of the one or more interactive engines from which the input is received;
determining, by the terminal, a component and an application corresponding to the interaction event based at least in part on registration information for the first interaction mode, wherein the component is mapped to a plurality of interaction events for a plurality of interaction modes; and
performing a response operation based at least in part on the registration information associated with the component and the interaction event, wherein the performing the response operation comprises:
  communicating, by the coordination scheduler, a notification to the application that the interaction event corresponded to a triggering of the component; and
  performing, by the application, the response operation based at least in part on the registration information associated with the component.

2. The method of claim 1, wherein the component corresponds to an element provided on a graphical user interface displayed by the terminal.

3. The method of claim 2, wherein the element is one or more of: a button, a hyperlink, an image, a set of text information, and/or an icon.

4. The method of claim 1, further comprising:
  obtaining the registration information associated with the component, wherein the registration information comprises the interaction event and an identifier corresponding to the component; and
  storing the registration information.

5. The method of claim 4, wherein storing the registration information comprises:
  storing a mapping of the identifier corresponding to the component to the interaction event; and
  registering the interaction event with an interaction engine associated with the first interaction mode.

6. The method of claim 1, wherein the first interaction mode includes a voice interaction mode, and the interaction event comprises: speech information corresponding to the component.

7. The method of claim 6, wherein the speech information corresponds to text information displayed in relation to the component, or the speech information corresponds to predefined text information that is mapped to the component.

8. The method of claim 1, wherein the first interaction mode includes a gesture interaction mode, and the interaction event comprises: set gesture features.

9. The method of claim 1, wherein a determination that the input corresponds to the interaction event in the first interaction mode is based at least in part on the registration information associated with the first interaction mode.

10. The method of claim 9, wherein the input is determined to correspond to the interaction event in response to a determination that the registration information associated with the first interaction mode comprises a type of the input or one or more characteristics associated with the input.

11. The method of claim 9, further comprising: determining that the input corresponds to the first interaction mode based on a type of the input or one or more characteristics associated with the input.

12. The method of claim 1, wherein the determining the component corresponding to the interaction event comprises:
  obtaining the registration information associated with the first interaction mode; and
  determining that the registration information comprises a mapping of the component to the first interaction mode.

13. The method of claim 1, wherein the response operation is determined based at least in part on a mapping of the response operation to the component.

14. The method of claim 1, wherein the response operation comprises navigating to a page provided by an application executing on the terminal.

15. The method of claim 1, wherein the response operation comprises obtaining information corresponding to a service provided by an application executing on the terminal.

16. The method of claim 1, wherein the response operation comprises invoking a function.

17. A device, comprising:
one or more processors configured to:
  obtain an input, wherein the input is obtained by one or more interaction engines running on the device;
  determine that the input corresponds to an interaction event in a first interaction mode, the first interaction mode being a non-touch interaction mode, wherein to determine that the input corresponds to the interaction event in the first interaction mode comprises:
    receive, by a coordination scheduler running on the device, the input from the one or more engines running on the device;
    determine, by the coordination scheduler, the one or more interactive engines from which the input is received; and
    determine, by the coordination scheduler, that the input is in accordance with the first interaction mode based at least in part on a determination of the one or more interactive engines from which the input is received;
  determine a component and an application corresponding to the interaction event based at least in part on registration information for the first interaction mode, wherein the component is mapped to a plurality of interaction events for a plurality of interaction modes; and
  perform a response operation based at least in part on the registration information associated with the component and the interaction event, wherein the performing the response operation comprises:
    communicate, by the coordination scheduler, a notification to the application that the interaction event corresponded to a triggering of the component; and
    perform, by the application, the response operation based at least in part on the registration information associated with the component; and
one or more memories coupled to the one or more processors, configured to provide the one or more processors with instructions.

18. A computer program product, the computer program product being embodied in a non-transitory computer readable storage medium and comprising computer instructions for:

- obtaining, by a terminal, an input, wherein the input is obtained by one or more interaction engines running on the terminal;
- determining, by the terminal, that the input corresponds to an interaction event in a first interaction mode, the first interaction mode being a non-touch interaction mode, wherein the determining that the input corresponds to the interaction event in the first interaction mode comprises:
  - receiving, by a coordination scheduler running on the terminal, the input from the one or more engines running on the terminal;
  - determining, by the coordination scheduler, the one or more interactive engines from which the input is received; and
  - determining, by the coordination scheduler, that the input is in accordance with the first interaction mode based at least in part on a determination of the one or more interactive engines from which the input is received;
- determining, by the terminal, a component and an application corresponding to the interaction event based at least in part on registration information for the first interaction mode, wherein the component is mapped to a plurality of interaction events for a plurality of interaction modes; and
- performing a response operation based at least in part on the registration information associated with the component and the interaction event, wherein the performing the response operation comprises:
  - communicating, by the coordination scheduler, a notification to the application that the interaction event corresponded to a triggering of the component; and
  - performing, by the application, the response operation based at least in part on the registration information associated with the component.

19. A system, comprising one or more processors that implement an operating system comprising:

- a first interaction engine corresponding to a first interaction mode, the interaction first engine configured to obtain information pertaining to an input obtained by a terminal, wherein the first interaction mode is a non-touch interaction mode, and the first interaction engine is one of a plurality of interaction engines running on the operating system; and
- a coordination scheduler configured to determine a component and application corresponding to an interaction event based at least in part on registration information for the first interaction mode, and to send a notification that the component has been triggered to invoke a response operation to be performed wherein:
- the component is mapped to a plurality of interaction events for a plurality of interaction modes; and
- the coordination scheduler determines that the input is in accordance with the first interaction mode based at least in part on a determination of the one or more interactive engines from which the input is received.

* * * * *